(12) United States Patent
Tanaka

(10) Patent No.: US 11,008,674 B2
(45) Date of Patent: May 18, 2021

(54) FIBER PROCESSING DEVICE AND FIBROUS FEEDSTOCK RECYCLING DEVICE

(71) Applicant: SEIKO EPSON CORPORATION, Tokyo (JP)

(72) Inventor: Hiroshi Tanaka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 194 days.

(21) Appl. No.: 16/225,766

(22) Filed: Dec. 19, 2018

(65) Prior Publication Data
US 2019/0186052 A1 Jun. 20, 2019

(30) Foreign Application Priority Data
Dec. 20, 2017 (JP) .............................. JP2017-244010

(51) Int. Cl.
| | |
|---|---|
| *D01G 9/10* | (2006.01) |
| *D01G 5/00* | (2006.01) |
| *B01D 46/00* | (2006.01) |

(52) U.S. Cl.
CPC ................ *D01G 9/10* (2013.01); *D01G 5/00* (2013.01); *B01D 46/0056* (2013.01)

(58) Field of Classification Search
USPC .......................................................... 162/4
See application file for complete search history.

(56) References Cited

U.S. PATENT DOCUMENTS

| | | | | | |
|---|---|---|---|---|---|
| 4,441,232 | A | * | 4/1984 | Underbrink ............... | D01B 1/06 19/48 R |
| 4,934,029 | A | * | 6/1990 | Wilkes ...................... | D01B 1/06 19/39 |
| 5,003,669 | A | * | 4/1991 | Wilkes ...................... | D01B 1/06 19/48 R |
| 6,449,804 | B1 | * | 9/2002 | Van Doorn ............... | D01B 1/04 19/39 |
| 2011/0174698 | A1 | | 7/2011 | Bergstrom et al. | |
| 2015/0090416 | A1 | | 4/2015 | Nakamura | |
| 2016/0243473 | A1 | | 8/2016 | Hicks et al. | |
| 2019/0194868 | A1 | * | 6/2019 | Tanaka ..................... | D21C 5/02 |
| 2019/0218714 | A1 | * | 7/2019 | Oguchi ..................... | D21F 9/00 |
| 2019/0301092 | A1 | * | 10/2019 | Yamasaki .............. | D21B 1/063 |
| 2020/0011010 | A1 | * | 1/2020 | Kobayashi ............... | D21B 1/32 |
| 2020/0011013 | A1 | * | 1/2020 | Kobayashi ............ | D21F 1/0027 |

FOREIGN PATENT DOCUMENTS

JP    H11-302990 A    11/1999

* cited by examiner

*Primary Examiner* — Mark Halpern
(74) *Attorney, Agent, or Firm* — Oliff PLC

(57) ABSTRACT

A separator as part of a sheet manufacturing apparatus has a mesh drum configured as a cylinder that can rotate and has mesh in at least part of the side; and a case that houses the mesh drum. The case has a supply port and a recovery port that communicate with an inside area, which is the inside of the mesh drum; a discharge port that communicates with a discharge area, which is outside the side of the mesh drum; and an inside wall segregating at least part of the inside area, forming a material recovery area. First screened material is supplied from the supply port to the inside area. In the material recovery area, the separator recovers accreted material, which is first screened material that was supplied through the supply port and accreted on the inside surface of the mesh drum, from the recovery port.

9 Claims, 6 Drawing Sheets

FIBER PROCESSING DEVICE AND FIBROUS FEEDSTOCK RECYCLING DEVICE

BACKGROUND

1. Technical Field

The present invention relates to a fiber processing device and a fibrous feedstock recycling device.

2. Related Art

Methods of recycling feedstock containing fiber such as recovered paper are known from the literature. See, for example, JP-A-H11-302990. When recycling such feedstock, extracting quality fiber with a high degree of whiteness from the feedstock is desirable. The method described in JP-A-H11-302990 defibrates the fiber in the feedstock by a wet defibration process, then deinks the fiber by adding hydrogen peroxide to improve whiteness, and then washes the fiber.

The system described in JP-A-H11-302990 requires a wet process in which the fiber is dispersed in water for processing. Because wet processing requires large volumes of water to separate the fibers in the feedstock, the configuration of the equipment is unavoidably large and complex. A method of efficiently extracting fiber from the feedstock is therefore desirable.

SUMMARY

The present invention is directed to this problem, and an objective of the invention is to efficiently extract fiber from feedstock containing fiber.

To achieve the foregoing objective, a fiber processing device according to the invention has a mesh member configured as a rotatable cylinder having mesh in at least part of the circumferential surface; and a case housing the mesh member, and having a first opening and a second opening communicating with a first area inside of the mesh member, a third opening communicating with a second area outside of the circumferential surface of the mesh member, a first wall segregating at least a part of the first area and forming a third area, the second opening communicating with the third area, separator feedstock containing fiber supplied from the first opening to the first area, and accreted material, which is a part of the separator feedstock supplied from the first opening that has accreted on the circumferential surface of the mesh member, being recovered from the second opening in the third area.

This configuration can continuously recover accreted material separated by the mesh member from the separator feedstock by rotation of the mesh member, and can efficiently extract fiber from the feedstock.

In a fiber processing device according to another aspect of the invention, a component of the separator feedstock supplied from the first opening that moves through the mesh member to the second area by an air current flowing from the first area to the second area exits with the air current from the third opening.

This configuration discharges components that move through the mesh member to the second area with the air current from the third opening, and thereby can prevent recovering unwanted components separated from the separator feedstock with the accreted material, and efficiently extract fiber from the feedstock.

In another aspect of the invention, the fiber processing device the first area has a fourth area segregated by the first wall from the third area, and the first opening communicates with the fourth area.

Because the first opening communicates with the fourth area separated from the third area in this configuration, the supplied separator feedstock mixing with the recovered fiber can be prevented, and fiber can be efficiently extracted from the feedstock.

A fiber processing device according to another aspect of the invention preferably also has an air current generator configured to supply an air current flowing from outside the circumferential surface of the mesh member, through the mesh member, to the third area.

By the air current generator supplying an air current through the mesh member to the third area, this configuration can separate accreted material from the surface of the mesh member in the third area, and efficiently recover desired fiber.

In another aspect of the invention, the fiber processing device also has a fifth area communicating through the mesh member with the third area, and a second wall between the second area and the fifth area.

By having a second wall between the second area and the fifth area that communicates through the mesh member with the third area, this configuration an efficiently recover fiber from the feedstock without components that moved through the mesh member adhering to the accreted material through the mesh member in the third area.

In another aspect of the invention, the fiber processing device also has a remover configured to remove in the third area the accreted material accreted on an inside surface of the mesh member.

By having a remover that removes accreted material from the inside surface of the mesh member, this configuration can reliably separate accreted material from the mesh member and effectively recover fiber.

In another aspect of the invention, the mesh member has multiple blades arrayed in the circumferential direction on the circumferential surface.

By having multiple blades disposed to the mesh member around the circumference, the blades can produce an air current by rotation of the mesh member, and can more effectively separate the accreted material from the mesh member.

In another aspect of the invention, the mesh member has multiple openings that are longer along the axis of rotation than the circumferential direction.

Because the mesh member in this configuration has multiple mesh openings that are longer along the axis of rotation than the circumferential direction, a wide channel enabling air to flow from the first area to the second area can be assured in the surface of the mesh member when the mesh member turns, and the separator feedstock can be efficiently classified.

To achieve the foregoing objective, another aspect of the invention is a fibrous feedstock recycling device including: a defibrator configured to defibrate feedstock containing fiber; a separator configured to classify defibrated material output from the defibrator; and a processor configured to process separated material that was classified by the separator; the separator having a mesh member configured as a rotatable cylinder with mesh in at least part of the circumferential surface, and a case housing the mesh member. The case has a first opening and a second opening communicating with a first area inside of the mesh member, a third opening communicating with a second area, which is outside the mesh member, a wall segregating at least a part of the first area and forming a third area, the second opening communicating with the third area. Separator feedstock containing fiber is supplied from the first opening to the first area, and accreted material, which is a part of the separator feedstock supplied from the first opening that has accreted on the circumferential surface of the mesh member, is recovered from the second opening in the third area.

This configuration can continuously recover accreted material separated by the mesh member from the separator feedstock by rotation of the mesh member, and can efficiently extract fiber from the feedstock.

Other objects and attainments together with a fuller understanding of the invention will become apparent and appreciated by referring to the following description and claims taken in conjunction with the accompanying drawings.

DESCRIPTION OF EMBODIMENTS

1. General Configuration of a Sheet Manufacturing Apparatus

Figure 1:
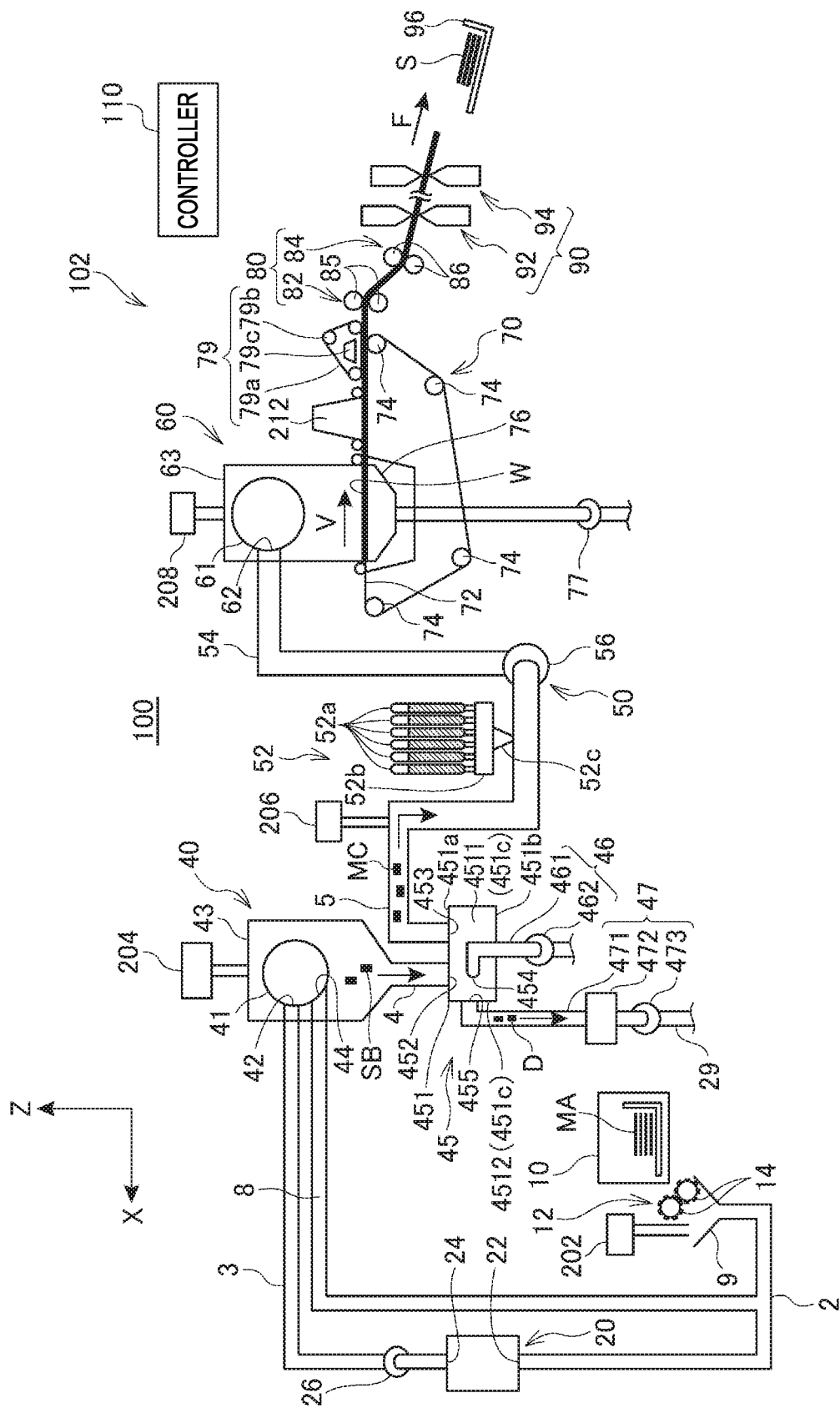
FIG. 1 illustrates the general configuration of a sheet manufacturing apparatus according to the invention.

FIG. 1 schematically illustrates the configuration of a sheet manufacturing apparatus 100 according to the invention.

The sheet manufacturing apparatus 100 according to the invention is an example of a fibrous feedstock recycling device, and executes a recycling process of defibrating feedstock containing fiber (fibrous feedstock) into individual fibers, and then making new sheets from the fiber material. The sheet manufacturing apparatus 100 manufactures various types of sheets by defibrating feedstock in a dry process into individual fibers, and then compressing, heating, and cutting. By mixing various additives to the defibrated material, the sheet manufacturing apparatus 100 can also improve the binding strength and whiteness of the sheet, and impart desirable characteristics such as color, scent, and flame resistance. By controlling the density, thickness, and form of the paper, the sheet manufacturing apparatus 100 can also produce various kinds of sheets. Examples of such sheets include A4 and A3 size office paper, cleaning sheets (such as sheets for sweeping floors), sheets for absorbing oil, and sheets for cleaning toilets, and molded sheet such as paper plates.

In the following description of the invention, the Z direction is opposite direction as the direction of the force of gravity, and indicates up. The opposite direction as the Z direction is the direction of the force of gravity, and indicates down. The Z direction also indicates the height of the case 451 of the separator 45 described below. The Z direction is the direction of the axis of rotation of the mesh drum 48 (mesh member) described below. The X direction and the Y direction are perpendicular to the Z direction and perpendicular to each other. The X direction is aligned with the direction of the width of the case 451. The X direction indicates the left, and the opposite of the X direction indicates the right. The Y direction is aligned with the depth of the case 451, that is, the direction between the front and back of the case 451. The Y direction indicates the front of the case 451, and the opposite direction as the Y direction indicates the back of the case 451.

The sheet manufacturing apparatus 100 has a supply device 10, shredder 12, defibrator 20, classifier 40, separator 45 (fiber processing device), mixing device 50, air-laying device 60 (accumulator), web former 70, conveyance device 79, sheet forming device 80, and cutting device 90. The sheet manufacturing apparatus 100 also has a controller 110 that controls parts of the sheet manufacturing apparatus 100.

The sheet manufacturing apparatus 100 also has multiple wetting units (humidifiers) 202, 204, 206, 208, 210, 212 for wetting (humidifying) the feedstock, and/or wetting (humidifying) the spaces through which the feedstock travels. The specific configuration of the wetting devices 202, 204, 206, 208, 210, 212 may be designed as desired, and steam, evaporative, warm air vaporization, ultrasonic, or other type of humidification method may be used.

In this embodiment, wetting devices 202, 204, 206, 208 are evaporative or warm air vaporization humidifiers, have a filter (not shown in the figure) that is wetted with water, and supply humidified air with a high humidity level by passing air through the filter.

Wetting devices 210 and 212 are ultrasonic humidifiers, have a vibrator for atomizing water, and supply the mist produced by the vibrator.

The supply device 10 supplies to the shredder 12 feedstock MA that the sheet manufacturing apparatus 100 recycles into sheets.

The feedstock MA is material containing fiber, and may be, for example, paper, pulp, pulp sheets, cloth, including nonwoven cloth, or textiles, for example. The feedstock of the sheet manufacturing apparatus 100 may be used paper, wastepaper, or other types of recovered paper, or unused (virgin) paper. The sheet manufacturing apparatus 100 described below uses recovered paper (including waste paper) as the feedstock.

The supply device 10 has a tray (not shown in the figure) that holds feedstock MA loaded by the user, a roller (not shown in the figure) that feeds the feedstock MA from the tray, and a motor (not shown in the figure) that drives the roller. The supply device 10 feeds feedstock MA to the shredder 12 by operation of the motor.

The shredder 12 has a pair of shredder blades 14 that shred the feedstock MA supplied from the supply device 10 to between the shredder blades 14, and a chute (also referred to as a hopper) 9 that receives the paper shreds cut by and falling from the shredder blades 14. The shredder 12 shreds (cuts) the feedstock MA supplied from the supply device 10 in air by means of the shredder blades 14, producing coarse shreds. The shredder 12 in this example has the configuration of a common paper shredder, for example. The shape and size of the shreds is not specifically limited and is suitable to the defibrating process of the defibrator 20. In this example, the shredder 12 cuts the feedstock MA into shreds approximately one to several centimeters square or smaller. The cut shreds may be square or rectangular, for example, and are not limited to any precise shape.

The chute 9 has a tapered shape with a width that gradually narrows in the direction the shreds flow (the downstream direction), and connects to the defibrator 20. The shreds cut by the shredder blades 14 are collected through the chute 9 and conveyed (transported) through a conduit 2 to the defibrator 20.

Wet (humidified) air is supplied by a wetting device 202 into or near the chute 9 to suppress accretion of shreds inside the chute 9 or conduit 2 due to static electricity. Because the shreds are thus conveyed with humid air to the defibrator 20, accretion of defibrated material inside the defibrator 20 can also be expected. A configuration supplies humid air from the wetting device 202 to the shredder blades 14 to remove static from the feedstock MA, or an ionizer may be disposed as a static eliminator to the shredder 12 and defibrator 20.

The defibrator 20 defibrates the shreds produced by the shredder 12, and outputs defibrated material.

As used herein, defibrate means to break apart and detangle feedstock (in this example, shreds or other undefibrated fibrous material) composed of many fibers bonded together into single individual fibers. The defibrator 20 also has the ability to separate from the fibers various materials adhering to (bonded with) the feedstock, such as resin particles, ink toner, and bleeding inhibitors. The material that has past through the defibrator 20 is referred to as defibrated material.

In addition to defibrated fibers that have been separated, the defibrated material may contain additives that are separated from the fiber during defibration, including resin (resin bonding multiple fibers together), ink, toner, and other color additives, bleeding inhibitors, and paper strengthening agents. The shape of the fiber in the defibrated material may be as strings or ribbons. The fiber contained in the defibrated material may be as individual fibers not intertwined with other fibers, or as clamps, which are multiple fibers tangled with other defibrated material into clumps.

The defibrator 20 defibrates in a dry process. A dry process as used herein means that the defibration process is done in air instead of a wet solution. The defibrator 20 uses a defibrator such as an impeller mill in this example. More specifically, the defibrator 20 has a rotor (not shown in the figure) that turns at high speed, and a liner (not shown in the figure) positioned around the outside of the rotor. The shreds produced by the shredder 12 in this configuration go between the rotor and the liner of the defibrator 20 and are defibrated.

The defibrator 20 produces an air current by rotation of the rotor. By this air current the defibrator 20 suctions the shreds from the conduit 2, and conveys the defibrated material to the exit 24. The defibrated material is delivered from the exit 24 through another conduit 3 to the classifier 40.

The sheet manufacturing apparatus 100 also has a defibrator blower 26 as an air current generator. The defibrator blower 26 is a fan disposed to the conduit 3, and suctions and pulls air with the defibrated material from the defibrator 20 to the classifier 40. The defibrated material is conveyed to the classifier 40 by the air current produced by the defibrator 20 and the air current produced by the defibrator blower 26.

The classifier 40 has an inlet 42, and defibrated material defibrated by the defibrator 20 flows from the conduit 3 with the air current into the inlet 42. The classifier 40 classifies the defibrated material introduced from the inlet 42 based on fiber length. More specifically, the classifier 40 separates the defibrated material defibrated by the defibrator 20 into first screened material SB (separator feedstock) consisting of defibrated material of a predetermined size or smaller, and second screened material consisting of defibrated material that is larger than the first screened material SB. The first screened material SB contains both fiber and particulate. The second screened material includes, for example, large fibers, undefibrated clumps (shreds that have not been sufficiently defibrated) and clumps of agglomerated or tangled defibrated threads.

The classifier 40 has a drum 41, and a housing 43 enclosing the drum 41.

The drum 41 is a cylindrical structure with a mesh, and the mesh may be a filter or a screen, for example. The mesh may be a metal screen, expanded metal made by expanding a metal sheet with slits formed therein, or punched metal having holes formed by a press in a metal sheet, for example. The drum 41 is driven rotationally by a motor (not shown in the figure), and functions as a sieve. By appropriately setting the size of the mesh, the drum 41 separates the defibrated material into first screened material SB that is smaller than the mesh openings, and second screened material that is larger than the mesh openings.

More specifically, by rotation of the drum 41, the first screened material SB passes through the mesh openings of the drum 41 and precipitates. The second screened material that cannot pass through the mesh of the drum 41 is carried to the exit 44 and pulled into the conduit 8 by the air current flowing from the inlet 42 to the drum 41.

The conduit 8 is connected between the inside of the drum 41 and conduit 2, and second screened material flowing from the drum 41 into the conduit 8 passes with the shreds from the shredder 12 through the conduit 2, and is carried into the inlet 22 of the defibrator 20. As a result, the second screened material is returned to the defibrator 20 and defibrated.

The first screened material SB selected by the drum 41 is dispersed in the air current, and descends to the case 451 (housing) of the separator 45 located below the drum 41.

The separator 45 separates the first screened material SB supplied from the classifier 40 through conduit 4 by size. More specifically, the separator 45 separates the first screened material SB into feedstock for processing MC (deposited material separated material) that is greater than or equal to a predetermined size, and waste D (components) that are smaller than the predetermined size. The waste D contains primarily impurities such as particles of color agents and other additives as described above, short fibers that are not suited for recycling into new sheets S as described below, and is not used to make new sheets S.

The processing feedstock MC contains primarily fiber, and consists primarily of fibers with a length suitable to making sheets S.

In other words, the separator 45 separates the first screened material SB into processing feedstock MC containing fiber suitable as material for making sheets S, and waste D, which is the remaining material not suitable for making sheets S.

The separator 45 has a case 451, air current generator 46, and a suction unit 47.

Figure 2:
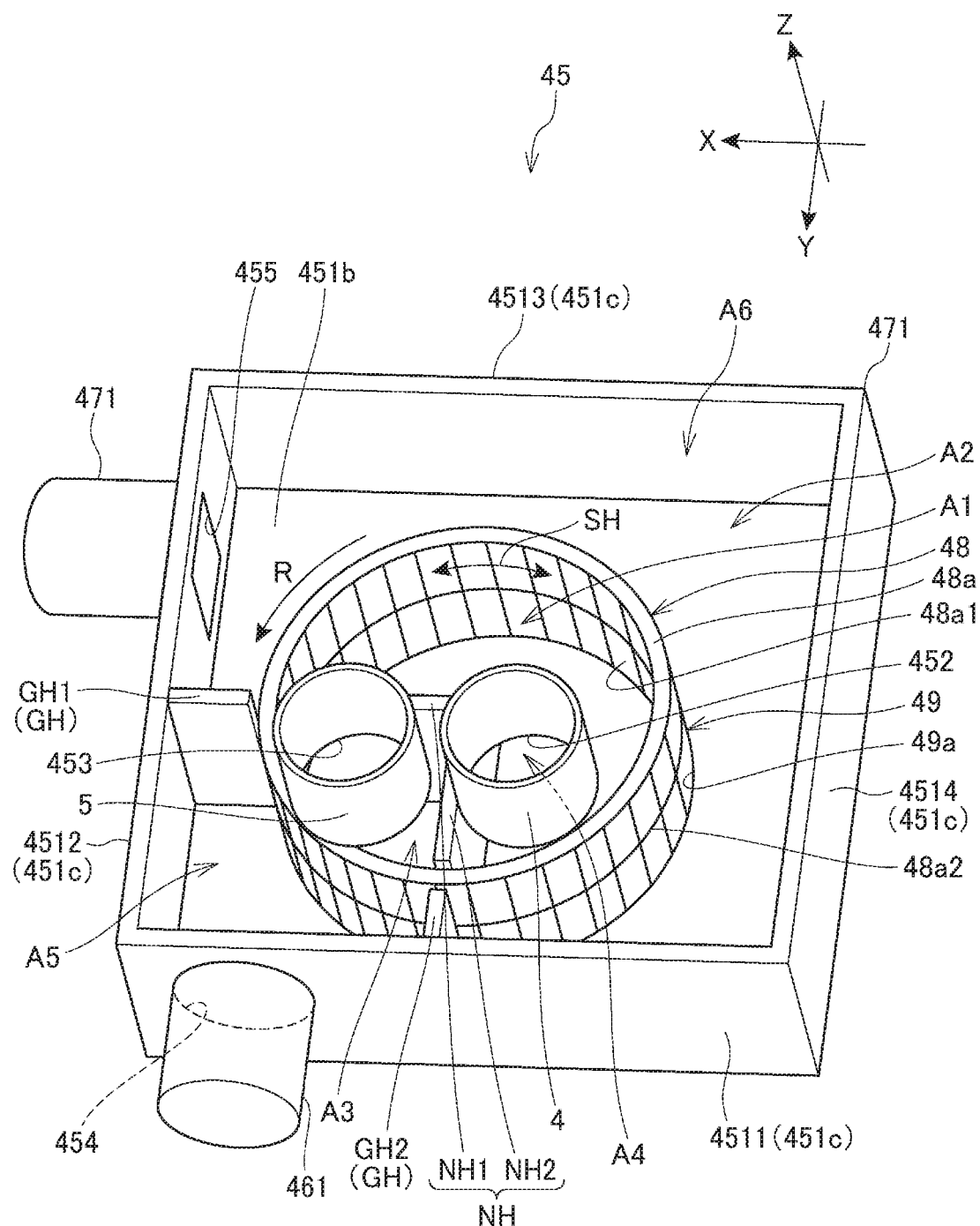
FIG. 2 is an oblique view showing main parts of the separator.

The case 451 is configured as a basically rectilinear box with a top 451a, bottom 451b, and four sides 451c (sides 4511, 4512, 4513, 4514) ((see FIG. 2), and houses a mesh drum 48 (see FIG. 2).

The case 451 has a supply port 452 (first opening) and a recovery port 453 (second opening) in the top 451a. The supply port 452 communicates through a conduit 4 with the classifier 40. First screened material SB selected by the drum 41 of the classifier 40 is supplied through the supply port 452 to the case 451. The recovery port 453 connects to the mixing device 50 through a conduit 5. Processing feedstock MC in the case 451 is recovered from the recovery port 453 through the conduit 5 by suction produced by the mixing blower 56 of the mixing device 50.

The case 451 has an air current supply port 454 that opens to side 4511 of multiple sides 451c. The air current supply port 454 connects to the air current generator 46.

The air current generator 46 includes a conduit 461 and a supply blower 462. An air current is supplied by the blower 462 through the conduit 461 and air current supply port 454 to the case 451. A discharge port 455 (third opening) is open in side 4512 of the multiple sides 451c. The suction unit 47 connects to the discharge port 455.

The suction unit 47 has a conduit 471, dust collector 472, and collection blower 473. The dust collector 472 of the suction unit 47 connects to the discharge port 455 through the conduit 471, and a collection blower 473 is disposed downstream from the dust collector 472. The collection blower 473 suctions air from the dust collector 472, and the air the collection blower 473 discharges is discharged outside of the sheet manufacturing apparatus 100 through the conduit 29.

The dust collector 472 is a filter or cyclonic dust collector, and separates particulate from the air current. The waste D us suctioned with the air by the suction of the dust collector 472, and is collected by the dust collector 472. The collection blower 473 has the effect of quickly separating the first screened material SB into processing feedstock MC and waste D.

Moist air is supplied by wetting device 204 to the space enclosing the drum 41. Wetting the first screened material SB by this moist air can be expected to have the effect of reducing accretion of first screened material SB in the case 451 due to static electricity, and facilitating removal of the processing feedstock MC from the case 451.

Humidified air is supplied by the wetting device 206 to the conduit 5, suppressing accretion of fiber in the conduit 5 due to static electricity. Furthermore, supplying humid air from conduit 5 to the mixing device 50 also has the effect of suppressing the effects of static in the mixing device 50.

The mixing device 50 has an additive supplier 52 that supplies an additive including resin, a conduit 54 through which an air current carrying the processing feedstock MC flows, and a mixing blower 56, and mixes an additive including resin with the fiber in the processing feedstock MC.

One or more additive cartridges 52a storing additives are installed to the additive supplier 52. The additive cartridges 52a may be removably installed to the additive supplier 52. The additive supplier 52 includes an additive extractor 52b that extracts additive from the additive cartridges 52a, and an additive injector 52c that injects the additive extracted by the additive extractor 52b into the conduit 54.

The additive extractor 52b has a feeder (not shown in the figure) that feeds additive in a powder or particulate form from inside the additive cartridges 52a, and removes additive from some or all of the additive cartridges 52a. The additive removed by the additive extractor 52b is conveyed to the additive injector 52c.

The additive injector 52c holds the additive removed by the additive extractor 52b. The additive injector 52c has a shutter (not shown in the figure) that opens and closes the connection to the conduit 54, and when the shutter is open, the additive extracted by the additive extractor 52b is fed into the conduit 54.

The shutter of the additive injector 52c has the effect of preventing excessive additive from being suctioned from the additive supplier 52 by the negative pressure produced by the air flow through the conduit 54.

The additive that the additive supplier 52 supplies includes resin that melt and bind multiple fibers together when heated. The resin contained in the additive may be a thermoplastic resin or thermoset resin, such as AS resin, ABS resin, polypropylene, polyethylene, polyvinyl chloride, polystyrene, acrylic resin, polyester resin, polyethylene terephthalate, polyethylene ether, polyphenylene ether, polybutylene terephthalate, nylon, polyimide, polycarbonate, polyacetal, polyphenylene sulfide, and polyether ether ketone. These resins may be used individually or in a desirable combination. The additive may contain only a single material or a mixture, both of which may comprise multiple types of particulate comprising a single or multiple materials. The additive supplied may also be a fibrous or powder form.

In addition to resin for binding fibers, and depending on the type of sheet being manufactured, the additive supplied from the additive supplier 52 may also include a coloring agent for coloring the fiber, an anti-blocking agent to prevent agglomeration of fibers and agglomeration of resin, or a flame retardant for making the fiber difficult to burn, for example. The additive not containing a coloring agent may be colorless or a color light enough to be considered colorless or white.

The types and numbers of additives the sheet manufacturing apparatus 100 uses are not specifically limited, and additive cartridges 52a corresponding to the types of additives used are installed to the additive supplier 52. The sheet manufacturing apparatus 100 may also use only some, or use all, of the additive cartridges 52a installed to the additive supplier 52.

In this example, six additive cartridges 52a are installed to the additive supplier 52. The six additive cartridges 52a include an additive cartridge 52a holding a colorless additive or an additive of a nearly-colorless pale color, and an additive cartridge 52a holding an additive that colors the fiber white. There are also additive cartridges 52a holding additives for coloring the fibers C (cyan), M (magenta), and Y (yellow).

The amount of additive the additive extractor 52b extracts from each of the additive cartridges 52a is controlled by the controller 110. By the controller 110 controlling the additive supplier 52, the sheet manufacturing apparatus 100 can operate to manufacture sheets S without coloring the fiber contained in the processing feedstock MC, and can operate to color the fiber used to manufacture sheets S. By supplying additive from any one of the color additive cartridges 52a, fibers can be colored white, cyan, magenta, or yellow. For example, whiteness can be improved by mixing fibers with white additive. Additive supplied from multiple additive cartridges 52a can also be mixed to produce fibers of desirably blended colors.

The additive supplied from the additive supplier 52 is conveyed through the conduit 54 and mixed with the fiber in the processing feedstock MC by the air current produced by the mixing blower 56, and passes through the mixing blower 56. The processing feedstock MC are detangled into individual fibers while flowing through conduit 5 and conduit 54. The fibers in the processing feedstock MC and the additive from the additive supplier 52 are mixed by the air current produced by the mixing blower 56 and/or the action of the blades or other rotating members of the mixing blower 56, and the mixture is conveyed through the conduit 54 to the air-laying device 60.

The mechanism that mixes the processing feedstock MC and additive is not specifically limited, and may be configured by mixing with blades rotating at a high speed, a mechanism that uses rotation of the container, such as a V mixer, and the mixing mechanism may be disposed before or after the mixing blower 56.

The mixture that passes the mixing device 50 is introduced from the inlet 62 to the air-laying device 60. The air-laying device 60 detangles and disperses the tangled defibrated material (fiber) in air, causing the mixture to fall onto the web forming device 70. When the resin in the additive supplied from the additive supplier 52 is fibrous, the resin fibers are also detangled by the air-laying device 60 and fall onto the web forming device 70.

The air-laying device 60 has a drum 61 and a housing 63 around the drum 61. The drum 61 is a cylindrical structure configured identically to the drum 41, has mesh like the drum 41, is driven rotationally by a motor, and functions as a sieve.

Note that the sieve of the drum 61 may be configured without functionality for selecting specific material. More specifically, the sieve used in the drum 61 means a device having mesh, and the drum 61 may cause all of the mixture introduced to the drum 61 to precipitate from the drum 61.

A web forming device 70 is disposed below the drum 61. The web forming device 70 includes, for example, a mesh belt 72, rollers 74, and a suction mechanism 76.

The mesh belt 72 is an endless belt, is tensioned by multiple rollers 74, and by operation of the tension rollers 74 is driven in the direction indicated by the arrow V in the figure. The mesh belt 72 may be metal, plastic, cloth, or nonwoven cloth. The surface of the mesh belt 72 is a screen with an array of openings of a specific size.

Of the fiber and particles dropping from the air-laying device 60, particles of a size that passes through the mesh drops through the mesh belt 72. Fiber of a size that cannot pass through the openings in the mesh accumulates on the mesh belt 72 and is conveyed in the direction of arrow V with the mesh belt 72.

The mesh in the mesh belt 72 is fine, and is sized so that the majority of the fiber and particles that drop from the drum 61 cannot pass through the mesh belt 72. This configuration causes material that passes through the mesh of the drum 61 to accumulate in the web forming device 70, and the accumulated material forms a web W.

The suction mechanism 76 includes a suction blower 77 disposed below the mesh belt 72, and by the suction of the suction blower 77 produces a flow of air in the suction mechanism 76 from the air-laying device 60 to the mesh belt 72.

The suction mechanism 76 pulls the mixture distributed in air by the air-laying device 60 onto the mesh belt 72, thereby promoting formation of a web W on the mesh belt 72. The suction mechanism 76 also has the effect of increasing the discharge rate from the air-laying device 60, and by creating a downward air current in the path of mixture precipitation, can prevent interlocking of defibrated material and additive while descending to the mesh belt 72.

The suction blower 77 may be configured to pass air suctioned from the suction mechanism 76 through a collection filter not shown before being discharged to the outside of the sheet manufacturing apparatus 100. Alternatively, the suction blower 77 may push the suctioned air to the dust collector 27 to collect the impurities contained in the air suctioned by the suction mechanism 76.

Humidified air is supplied by the wetting device 208 to the space surrounding the drum 61. As a result, the inside of the air-laying device 60 can be humidified by the humidified air, fiber and particles accumulating on the housing 63 due to static electricity can be suppressed, fiber and particles can be made to fall quickly onto the mesh belt 72, and a web W of a desired form can be made.

Air carrying mist is supplied by the wetting device 212 to the conveyance path of the mesh belt 72 on the downstream side of the air-laying device 60. As a result, the water content of the web W can be adjusted, and accretion of fiber on the mesh belt 72 due to static electricity is also suppressed.

The web W formed by the air-laying device 60 and web forming device 70 is then separated from the mesh belt 72 and conveyed to the sheet forming device 80 by a conveyance device 79. The conveyance device 79 includes, for example, a mesh belt 79a, tension rollers 79b, and a suction mechanism 79c.

The suction mechanism 79c includes a blower (not shown in the figure), and by the suction force of the blower produces an upward air current on the mesh belt 79a. As a result of this air current, the web W separates from the mesh belt 72 and is pulled to the mesh belt 79a. The mesh belt 79a moves in conjunction with the tension rollers 79b, and conveys the web W to the sheet forming device 80.

The sheet forming device 80 binds fibers in the mixture through the resin contained in the additive by applying heat to the fiber and additive contained in the web W.

More specifically, the sheet forming device 80 has a compression device 82 that compresses the web W, and a heating device 84 that heats the web W after the web W is compressed by the compression device 82.

The compression device 82 in this example comprises a pair of calender rolls 85 that hold the web W with a specific nipping force, compress the web W to a high density, and convey the compressed web W to the heating device 84.

The heating device 84 has a pair of heat rollers 86 which heat the web W as it passes between the heat rollers 86 after being compressed by the calender rolls 85, forming a sheet S.

The cutting device 90 cuts the sheet S formed by the sheet forming device 80. In this example, the cutting device 90 has a first cutter 92 that cuts the sheet S crosswise to the conveyance direction of the sheet S indicated by the arrow F in the figure, and a second cutter 94 that cuts the sheet S parallel to the conveyance direction F. Single sheets of a specific size are formed by cutting the web W in this way. The single sheets S cut by the cutting device 90 are then stored in the discharge tray 96. The discharge tray 96 may be a tray or stacker for holding the manufactured sheets, and the sheets S discharged to the tray can be removed and used by the user.

Parts of the sheet manufacturing apparatus 100 are configured as a defibration process unit 101 and recycling unit 102.

The defibration process unit 101 comprises at least the supply device 10 and defibrator 20, and may include the classifier 40 and separator 45. The defibration process unit 101 produces defibrated material or processing feedstock MC from the feedstock MA. The product manufactured by the defibration process unit 101 may be removed from the sheet manufacturing apparatus 100 and stored without passing the mixing device 50. This manufactured product may also be sealed in specific packages, which may then be shipped and sold (marketed).

The recycling unit 102 is a functional unit that processes the product produced by the defibration process unit 101 into sheets S, includes the mixing device 50, web forming device 70, conveyance device 79, sheet forming device 80, and cutting device 90, and may also include an additive supplier 52.

The sheet manufacturing apparatus 100 may also be configured with the defibration process unit 101 and recycling unit 102 in an integrated system, or as separate devices. In this case, the defibration process unit 101 is an example of a fibrous feedstock recycling device according to the invention. The recycling unit 102 is an example of a sheet forming device that processes defibrated material into sheets. Each of these components may also be conceived of as processing devices.

2. Separator Configuration

The configuration of the separator 45 is described next.

FIG. 2 is an oblique view of main parts of the separator 45. To illustrate the configuration of the inside of the case 451, FIG. 2 omits the top 451a shown in FIG. 1. Note that to illustrate the relationship between the locations of the supply port 452 and the recovery port 453, and the areas inside the case 451, the supply port 452 and conduit 4, and the recovery port 453 and conduit 5, are also shown for convenience.

Figure 3:
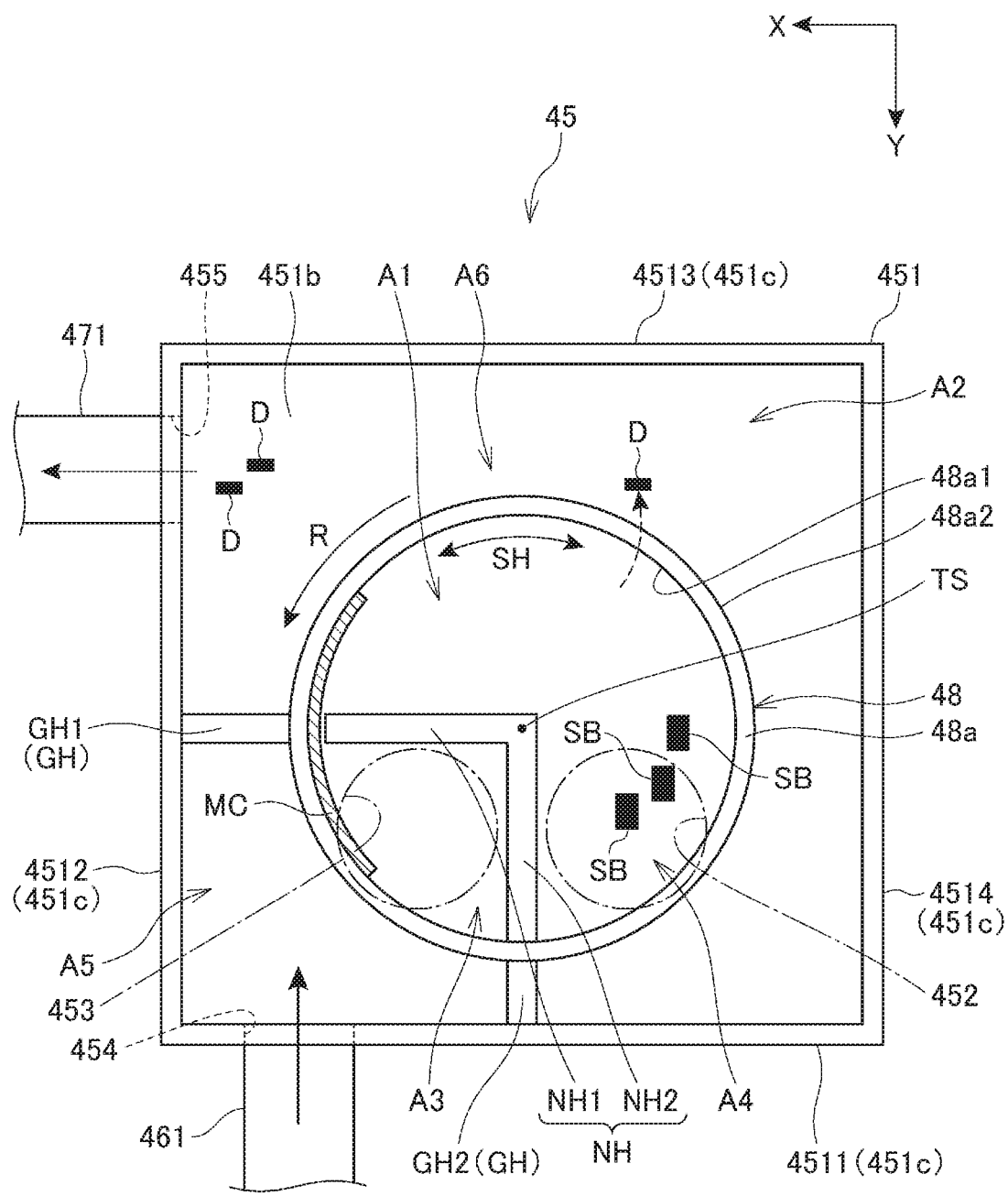
FIG. 3 is a plan view showing main parts of the separator.

FIG. 3 is a plan view of main parts of the separator 45 as seen from the top 451a.

As shown in FIG. 2 the sides 451c of the case 451 are disposed rising from the bottom 451b with side 4511 opposite side 4513, and side 4512 opposite side 4514. The top 451a not shown in FIG. 2 is opposite the bottom 451b, and is disposed in contact with each of the sides 451c. As a result, the case 451 forms a basically rectangular box with space inside.

Figure 4:
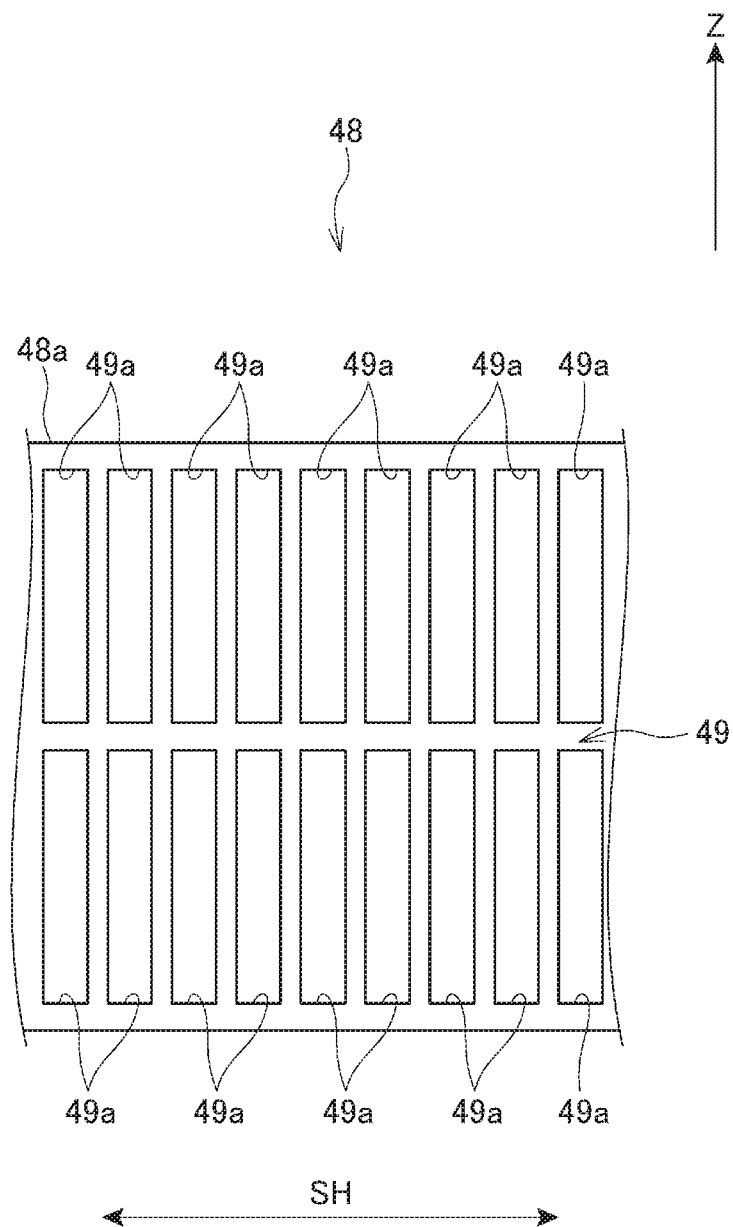
FIG. 4 is a side view of the main part of the mesh drum.

A mesh drum 48 is disposed inside the case 451. The mesh drum 48 is a member formed in a cylindrical shape (cylinder) in circumferential direction SH (FIG. 4). The mesh drum 48 has mesh 49 comprising numerous mesh openings 49a in at least part of the side 48a (circumferential surface) (the entire surface in this example). The mesh openings 49a are pass from the inside surface 48a1, which is the surface on the inside of the side 48a, to the outside surface 48a2, which is the surface on the outside of the side 48a.

FIG. 4 is a side view of the main part of the mesh drum 48. The Z direction shown in FIG. 4 indicates the axis of rotation of the mesh drum 48. FIG. 4 shows part of the mesh 482 of the mesh drum 48.

The mesh drum 48 has numerous mesh openings 49a that are longer along the axis of rotation than the circumferential direction. SH of the mesh drum 48 formed in the side 48a. FIG. 4 shows an example in which the mesh drum 48 is configured with numerous rectangular mesh openings 49a in the side 48a, but the shape of the mesh openings 49a is not limited to rectangular, and the mesh openings 49a may be oval, triangular, or other shape as long as the mesh openings 49a are longer along the axis of rotation than the circumferential direction SH. In the configuration shown in FIG. 4 the multiple mesh openings 49a are arranged in a grid in the side 48a of the mesh drum 48, but the arrangement of the multiple mesh openings 49a is not limited to a grid pattern.

As shown in FIG. 2 and FIG. 3, the mesh drum 48 rises from the bottom 451b inside the case 451 with the center TS of the mesh drum 48 located substantially in the center of the bottom 451b. The mesh drum 48 is disposed inside the case 451 in contact with the top 451a. The mesh drum 48 turns in the direction of rotation indicated by arrow R with the center TS at the axis of rotation when driven as controlled by the controller 110 by a motor and a power transfer mechanism that transfers power from the motor. The mesh drum 48 can also turn due to suction (air flow) produced by the collection blower 473 connected to the conduit 471.

The inside of the case 451 is divided by the mesh drum 48 into two areas. In other words, the inside of the case 451 is divided into an inside area A1 (first area), which is the area inside the mesh drum 48, and an outside area A6 (sixth area), which is the area outside the mesh drum 48.

In the inside area A1 is an inside wall NH (first wall), which is a wall segmenting the inside area A1. The inside wall NH includes inside wall NH1 and inside wall NH2. The ends of inside wall NH1 and inside wall NH2 connect at the center TS of the mesh drum 48 so that the inside wall NH forms an L when seen from the top 451a.

Inside wall NH1 is a divider extending in the inside area A1 from the center TS of the mesh drum 48 to the left (the X direction) and is positioned opposite outside wall GH1 with the mesh drum 48 therebetween. There is a specific gap formed between the inside wall NH1 and the inside surface 48a1 of the mesh drum 48. The inside wall NH1 also contacts the top 451a and bottom 451b.

Inside wall NH2 is a divider extending in the inside area A1 from the center TS of the mesh drum 48 to the front (the Y direction), and is positioned opposite outside wall GH2 with the mesh drum 48 therebetween. As shown in FIG. 2 and FIG. 3, inside wall NH2 is preferably disposed to contact the inside surface 48a1 of the mesh drum 48. The inside wall NH2 also contacts the top 451a and bottom 451b.

The inside area A1 is divided into two areas by the inside wall NH, a material supply area A4 (fourth area) and a material recovery area A3 (third area).

Of the space divided by the inside wall NH, the material supply area A4 is the area that communicates with the supply port 452. Of the space divided by the inside wall NH, the material recovery area A3 is the area that communicates with the recovery port 453. The supply port 452 communicates with the material supply area A4 at a position as far as possible from the recovery port 453 on the upstream side in the direction of rotation indicated by the arrow R (in FIG. 2 and FIG. 3, a position in inside area A1 at the bottom right).

Disposed in the outside area A6 is an outside wall GH (second wall) that divides the outside area A6. The outside wall GH includes a outside wall GH1 and outside wall GH2.

Outside wall GH1 is a divider extending inside the outside area A6 from side 4512 to the right, and is disposed to a position opposite the inside wall. NH1 with the mesh drum 48 therebetween. This outside wall GH1 contacts top 451a and bottom 451b and the outside surface 48a2 of the mesh drum 48. Outside wall GH2 is a divider extending inside the outside area A6 from side 4511 to the back, and is disposed to a position opposite the inside wall NH2 with the mesh drum 48 therebetween. This outside wall GH2 contacts top 451a and bottom 451b and the outside surface 48a2 of the mesh drum 48.

By disposing this outside wall GH, the outside area A6 is divided into two areas, a discharge area A2 (second area) and an air current supply area A5 (fifth area).

The discharge area A2 communicates through the mesh drum 48 with the material supply area A4 of the areas formed by the outside wall GH, and is also the area that communicates with the discharge port 455 formed in the side 4512. The air current supply area A5 communicates through the mesh drum 48 with the material recovery area A3 of the areas formed by the outside wall GH, and is also the area that communicates with the air current supply port 454 formed in the side 4511.

As described above, the case 451 of the separator 45 houses a mesh drum 48. Inside the mesh drum 48 is disposed an inside wall NH, and the inside area A1 is divided into a material supply area A4 that communicates with the supply port 452, and a material recovery area A3 that communicates with the recovery port 453. As described above, the supply port 452 communicates through conduit 4 with the classifier 40.

As a result, first screened material SB is supplied from the classifier 40 to the material supply area A4. The first screened material SB supplied to the material supply area A4 is conveyed to the material recovery area A3 by rotation of the mesh drum 48 turning on the center TS at the axis of rotation. The centrifugal force produced by the rotation of the mesh drum 48 causes components of the first screened material SB that are smaller than the size of the mesh openings 49a to move as waste D from the material supply area A4 to the discharge area A2. As a result, the first screened material SB conveyed to the material recovery area A3 has the waste D removed therefrom.

The first screened material SB is also conveyed to the material recovery area A3 clinging to the inside surface 48a1 due to the centrifugal force produced by the rotation of the mesh drum 48. As described above, the recovery port 453 communicates with the mixing device 50 through a conduit 5. As a result, material clinging to the mesh drum 48, that is, the first screened material SB from which the waste D was removed, is recovered from the material recovery area A3 as processing feedstock MC.

In this way, by rotation of the mesh drum 48, the separator 45 continuously recovers the first screened material SB from which waste D was removed as processing feedstock MC, and can efficiently extract fiber from the first screened material SB supplied from the classifier 40.

Note that removing fiber from the first screened material SB is equivalent to removing fiber from the feedstock MA. In this embodiment, the material supplied to the separator 45 is the first screened material SB supplied from the classifier 40. However, the invention is not so limited, and the material defibrated by the defibrator 20 may be supplied directly to the separator 45.

In the material recovery area A3 and air current supply area A5, the air flow from the air current supply port 454 through the mesh drum 48 to the material recovery area A3 is supplied by the air current generator 46. As a result, accreted material clinging to the inside surface 48a1 of the mesh drum 48 in the material recovery area A3 is pushed in the direction away from the inside surface 48a1 by the air current from the mesh outside surface 48a2 to the inside surface 48a1, and is separated from the inside surface 48a1. The accreted material separated from the inside surface 48a1 of the mesh drum 48 is recovered through the recovery port 453 as processing feedstock MC. By thus recovering accreted material by an air current supplied by the air current generator 46, fiber can be efficiently recovered from the inside surface 48a1 of the mesh drum 48. In addition, because the accreted material is separated from the inside surface 48a1 by an air current, deformation of the mesh openings 49a in the mesh 49 of the mesh drum 48 is reduced.

The supply port 452 communicates with the material supply area A4 at a position as far as possible from the recovery port 453 on the upstream side in the direction of rotation indicated by the arrow R (in FIG. 2 and FIG. 3, a position in inside area A1 at the bottom right). This configuration increases the length of time the waste D is removed from the first screened material SB until recovery from the recovery port 453, and the separator 45 can more accurately separate the waste D from the first screened material SB. The separator 45 can therefore accurately extract fiber from the first screened material SB.

Because the supply port 452 communicates with the material supply area A4 formed by the inside wall NH, the first screened material SB supplied to the material supply area A4 will not be recovered from the recovery port 453 of the separator 45 without the waste D being removed. In other words, the separator 45 can prevent processing feedstock MC being recovered mixed with components that are not suited to making sheets S.

As described above, the inside wall NH1 is disposed with a specific gap to the inside surface 48a1 of the mesh drum 48. As a result, accreted material clinging to the inside surface 48a1 of the mesh drum 48 will not be wiped off by the inside wall NH1. The inside wall NH1 thus divides the inside area A1 so that the accreted material can be conveyed to the material recovery area A3.

The inside wall NH2 is preferably disposed to contact the inside surface 48a1 of the mesh drum 48. As a result, the inside wall NH2 can prevent first screened material SB supplied to the material supply area A4 from being recovered from the recovery port 453 without being separated by the mesh drum 48. Because the inside wall NH2 contacts the inside surface 48a1 of the mesh drum 48, the inside wall NH2 can wipe the accreted material from the inside surface 48a1. Furthermore, because the inside wall NH2 contacts the inside surface 48a1 of the mesh drum 48 downstream from the recovery port 453 in the direction of rotation indicated by arrow R, accreted material that could not be separated by the air current from the air current supply port 454 can be wiped off.

The air current supply area A5 is separated from the discharge area A2 by the outside wall. GH. As a result, the separator 45 can prevent waste D that moved from the material supply area A4 to the discharge area A2 from moving into the air current supply area A5. The separator 45 can therefore prevent waste D from sticking to the accreted material through the mesh drum 48 in the material recovery area A3 due to the air current supplied from the air current supply port 454. Therefore, the separator 45 can efficiently extract fiber from the first screened material SB.

Note that this embodiment describes a configuration having the mesh drum 48 in contact with the outside wall GH1, but the gap between the mesh drum 48 and outside wall GH1 may be a gap small enough that waste D in the discharge area A2 cannot enter the air current supply area A5. As a result, waste D entering the air current supply area A5 from the discharge area A2 due to the air current supplied from the air current supply port 454 in the air current supply area A5 can be suppressed. Furthermore, when there is a gap between the mesh drum 48 and outside wall GH1, a pile seal or similar member may be disposed in the gap. This configuration has the same effect.

The discharge area A2 communicates with the discharge port 455. As described above, the suction unit 47 connects to the discharge port 455. As a result, waste D that moves from the material supply area A4 to the discharge area A2 is discharged from the case 451 by the suction of the collection blower 473 with the air current. As a result, the separator 45 can prevent accumulation of waste D in the case 451, and the waste D adhering again to the first screened material SB. Therefore, the separator 45 can efficiently extract fiber from the first screened material SB.

As shown in FIG. 4, the mesh drum 48 has numerous mesh openings 49a that are longer in the direction of the axis of rotation than the circumferential direction SH. As a result, the separator 45 can assure a wide channel in the side 48a of the mesh drum 48 for the air current to flow from the material supply area A4 to the discharge area A2 when the mesh drum 48 turns, and can efficiently remove waste D from the first screened material SB. Note that the air current referred to here is the air current suctioned by the suction unit 47.

3. Variation 1

Figure 5:
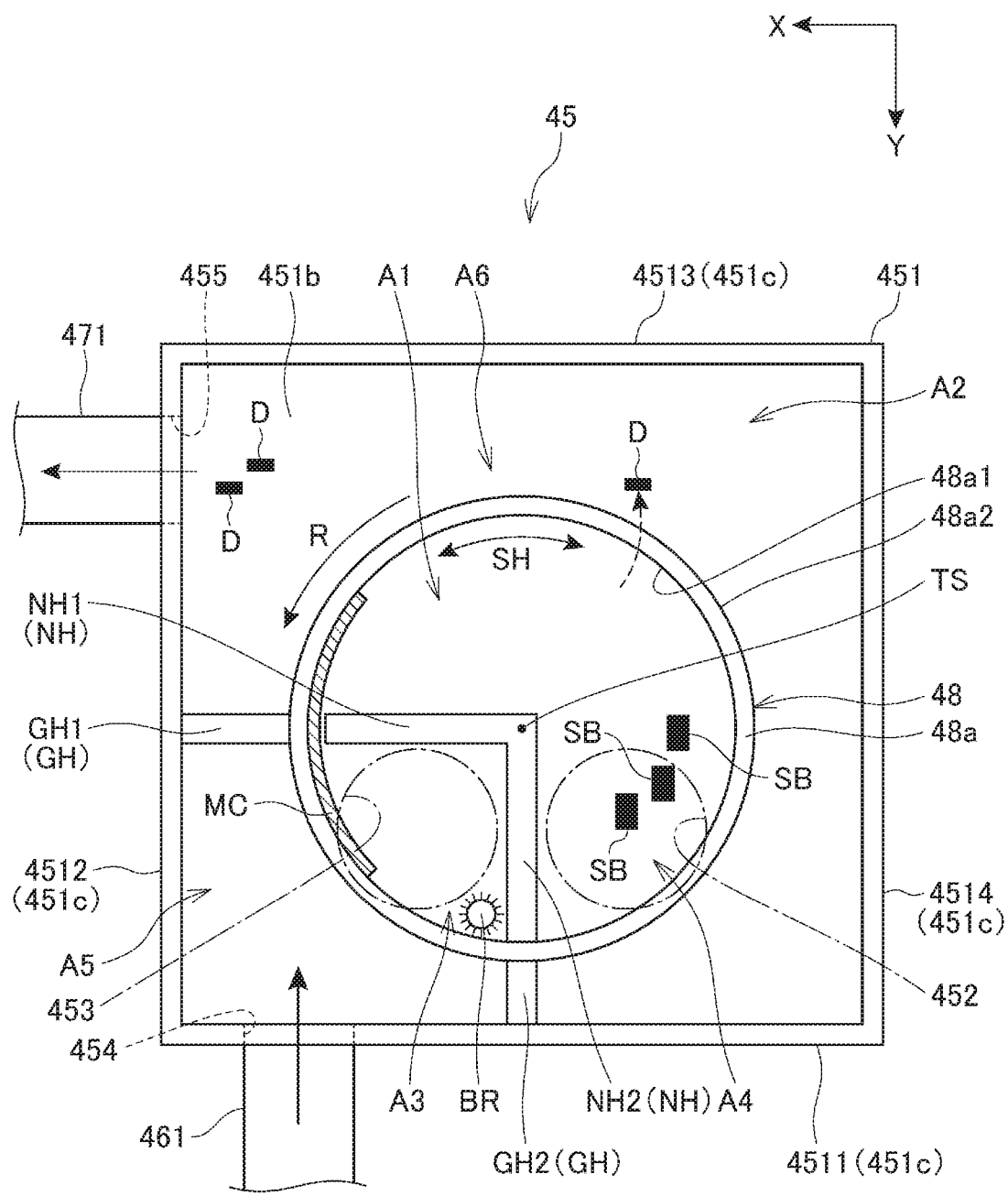
FIG. 5 is a plan view showing main parts of the separator in a first variation of the invention.

FIG. 5 is a plan view of main parts of the separator 45 in a first variation of the embodiment described above.

In the following description of a separator 45 according to a first variation as shown in FIG. 5, like parts in this and the separator 45 shown in FIG. 3 are identified by like reference numerals, and further detailed description is omitted or simplified.

As will be understood by comparing FIG. 5 and FIG. 3, the separator 45 according to this first variation has a brush roller BR that removes accreted material clinging to the inside surface 48a1 of the mesh drum 48 in the material recovery area A3.

The brush roller BR has a roll extending on the Z direction, and numerous protrusions protruding from the outside surface of the roll. The length of the brush roller BR in the Z direction is greater than or equal to the height of the side 48a of the mesh drum 48. The brush roller BR is disposed in the material recovery area A3 so that at least the protrusions contact the inside surface 48a1 of the mesh drum 48, and rotates freely in conjunction with rotation of the mesh drum 48, or rotates as controlled by the controller 110. By disposing a brush roller BR in the material recovery area A3, the separator 45 can more reliably wipe accreted material from the inside surface 48a1 of the mesh drum 48, and can effectively recover the accreted material from the recovery port 453.

More particularly, as shown in FIG. 5, disposing the brush roller BR downstream in the direction of rotation indicated by arrow R from the recovery port 453 in the material recovery area A3 has the following effect. That is, by locating the brush roller BR as shown in FIG. 5, the separator 45 can separate from the inside surface 48a1 of the mesh drum 48 accreted material that passes through the recovery port 453 without being separated from the inside surface 48a1. In this configuration, the brush roller BR preferably turn clockwise as controlled by the controller 110. As a result, the brush roller BR can remove accreted material toward the recovery port 453, and the separator 45 can more effectively recover the accreted material.

Note that FIG. 5 shows a configuration in which the brush roller BR is disposed in the material recovery area A3 downstream in the direction of rotation indicated by arrow R from the recovery port 453, but the location of the brush roller BR may be upstream in the direction of rotation indicated by arrow R from the recovery port 453. Because this configuration can remove accreted material from the inside surface 48a1 of the mesh drum 48 upstream from the recovery port 453 in the direction of rotation indicated by arrow R, the separator 45 can recover the accreted material without having an air current generator 46. The separator 45 can also be compactly configured because there is no need for a air current generator 46. In this configuration the brush roller BR also preferably turns freely in conjunction with rotation of the mesh drum 48, or turns counterclockwise as controlled by the controller 110. As a result, the brush roller BR can remove accreted material toward the recovery port 453, and the separator 45 can more effectively recover the accreted material.

The separator 45 according to this first variation has a brush roller BR as the removal means, but the means of removing the accreted material is not limited to a brush roller BR. For example, the remover may be a non-rotating, stationary wiper or scraper, or any other configuration that can remove accreted material from the inside surface 48a1 of the mesh drum 48.

4. Variation 2

Figure 6:
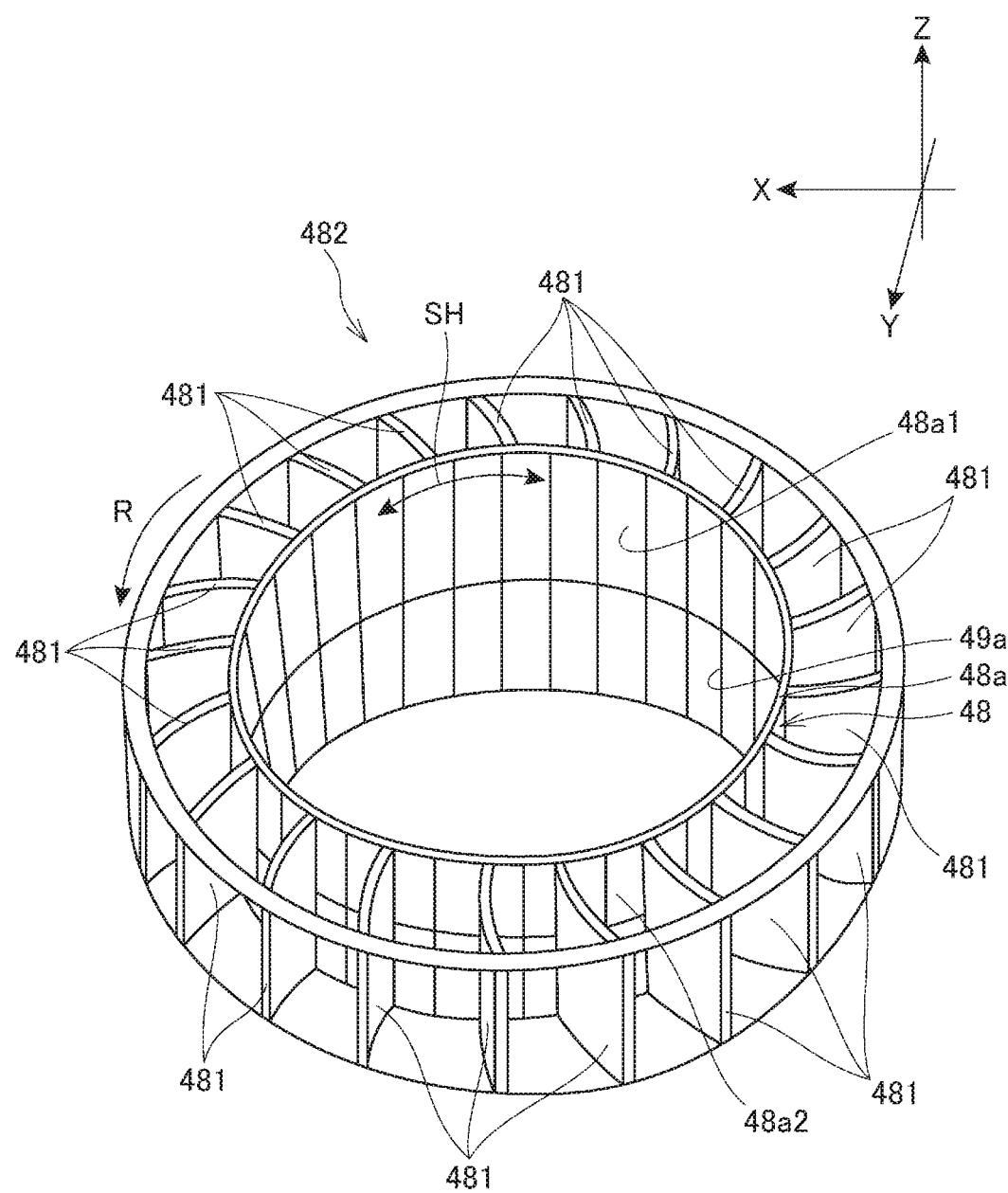
FIG. 6 is a plan view showing main parts of the mesh drum in a second variation of the invention.

FIG. 6 is an oblique view of the mesh drum 48 (mesh member) according to a second variation.

In the description of the mesh 482 of the mesh drum 48 shown in FIG. 6, elements that are the same as the configuration of the mesh drum 48 shown in FIG. 2 are identified by like reference numerals, and further description thereof is omitted.

As will be understood from comparing FIG. 6 and FIG. 2, the mesh unit 482 in this second variation has multiple fan blades 481 (blades) disposed to the outside surface 48a2 in the circumferential direction SH around the mesh drum 48. Each fan blade 481 is a panel member that curves in the radial direction of the mesh drum 48 from the outside surface 48a2 to the outside of the mesh drum 48.

The separator 45 has this mesh unit 482 housed inside the case 451 instead of the mesh drum 48 shown in FIG. 2, causes the mesh unit 482 to rotate in the direction of arrow R, and separates the waste D from the first screened material SB. As the mesh unit mesh 482 turns, the fan blades 481 produce an air current in the direction moving away from the outside surface 48a2. Production of this air current also produces an air flow in the mesh unit 482 moving from the inside surface 48a1 to the outside surface 48a2.

As a result, the separator 45 promotes separation of the waste D from the first screened material SB in the material supply area A4, and more effectively removes waste D from the first screened material SB. Furthermore, because the mesh unit 482 produces an air current from the inside surface 48a1 to the outside surface 48a2, there is no need for a separate device to produce an air current from the inside surface 48a1 to the outside surface 48a2. This second variation therefore enables configuring the separator 45 more compactly.

As described above, the separator 45 (fiber processing device) is configured as a round cylinder (cylinder shape) that can rotate, and has a mesh drum 48 (mesh member) with mesh 49 in at least part of the side 48a (circumferential surface), and a case 451 (housing) that houses the mesh drum 48.

The case 451 has a supply port 452 (first opening) that communicates with an inside area A1 (first area) inside the mesh drum 48, and a discharge port 455 (third opening) that communicates with an discharge area A2 (second area) outside the mesh drum 48. The case 451 also has an inside wall NH (first wall, divider) that segregates at least part of the inside area A1, forming a material recovery area A3 (third area). The recovery port 453 communicates with the material recovery area A3. The first screened material SB (separator feedstock, that is, material containing fiber to be separated and recovered) is supplied from the supply port 452 to the inside area A1. In the material recovery area A3, the separator 45 recovers from the recovery port 453 as processing feedstock MC first screened material SB that was supplied from the supply port 452 and accreted on the inside surface 48a1 of the mesh drum 48.

By rotation of the mesh drum 48, this configuration can continuously recover the first screened material SB from which waste D was removed by the mesh drum 48, and efficiently extract fiber from the first screened material SB.

Of the first screened material SB supplied from the supply port 452, the separator 45 also discharges with the air current from the discharge port 455 waste D (component) that moved through the mesh drum 48 into the discharge area A2 by the air current flowing from the inside area A1 to the discharge area A2.

Because the separator 45 in this configuration discharges waste D with the air current from the discharge port 455, the separator 45 prevents waste D from accumulating in the case 451, and prevents recovering waste D separated from the first screened material SB with the fiber. The separator 45 can therefore efficiently extract fiber from the first screened material SB.

The inside area A1 includes a material recovery area A3 and a material supply area A4 (fourth area) formed by an inside wall NH. The material supply area A4 communicates with the supply port 452.

Because the supply port 452 communicates with the material supply area A4 which is separated from the material recovery area A3 by the inside wall NH, this configuration can prevent the first screened material SB supplied into the material supply area A4 from mixing with the fiber recovered from the recovery port 453. The separator 45 can therefore efficiently extract fiber from the first screened material SB.

The separator 45 also has an air current generator 46 that supplies an air current from outside the mesh drum 48 through the mesh drum 48 into the material recovery area A3.

In this configuration, the separator 45 can remove accreted material from the inside surface 48a1 of the mesh drum 48 in the material recovery area A3, and recover fiber by the air current generator 46 supplying an air current through the mesh drum 48 into the material recovery area A3. Because the accreted material is separated by the flow of air, the separator 45 can recover fiber without the mesh openings 49a being deformed.

The separator 45 also has an air current supply area A5 (fifth area) that communicates with the material recovery area A3 through the mesh drum 48. The separator 45 also has an outside wall GH (second wall) between the discharge area A2 and air current supply area A5.

Because of the outside wall GH, the separator 45 in this configuration can efficiently recover fiber without waste D that moved through the mesh drum 48 sticking to the accreted material through the mesh drum 48 in the material recovery area A3.

The separator 45 may also have a brush roller BR (remover) in the material recovery area A3 that removes (separates) accreted material clinging to the inside surface 48a1 (inside surface) of the mesh drum 48.

By disposing a brush roller BR in the material recovery area A3, the separator 45 in this configuration can more reliably wipe accreted material from the inside surface 48a1 of the mesh drum 48, and effectively recover the accreted material through the recovery port 453.

The mesh unit 482 (mesh member) may also have multiple fan blades 481 (blades) disposed in the circumferential direction SH to the outside surface 48a2 of the mesh drum 48.

In this configuration the mesh unit 482 can produce an air current by the fan blades 481, promoting separation of the waste D from the first screened material SB in the material supply area A4, and more effectively removing waste D from the first screened material SB.

The mesh drum 48 also has multiple mesh openings 49a that are longer in the direction of the axis of rotation than the circumferential direction SB.

In this configuration, the separator 45 can assure a wide channel in the side 48a of the mesh drum 48 for the air current to flow from the material supply area A4 to the discharge area A2 when the mesh drum 48 turns, and can efficiently remove waste D from the first screened material SB.

A sheet manufacturing apparatus 100 (fibrous feedstock recycling device) has a defibrator 20 for defibrating feedstock MA; a separator 45 for separating first screened material SB, which is the defibrated material output by the defibrator 20; and a processor (mixing device 50, sheet forming device 80, and cutting device 90) for processing processing feedstock MC, which is material separated by the separator 45.

The separator 45 has a mesh drum 48 configured as a cylinder that can rotate and has mesh 49 in at least part of the side 48a; and a case 451 that houses the mesh drum 48.

The case 451 has a supply port 452 and a recovery port 453 that communicate with an inside area A1, which is the inside of the mesh drum 48; and a discharge port 455 that communicates with a discharge area A2, which is outside the side 48a of the mesh drum 48. The case 451 also has a inside wall NH segregating at least part of the inside area A1, forming a material recovery area A3. The recovery port 453 communicates with the material recovery area A3. First screened, material SB is supplied from the supply port 452 to the inside area A1. In the material recovery area A3, the separator 45 recovers accreted material, which is first screened material SB that was supplied through the supply port 452 and accreted on the inside surface 48a1 of the mesh drum 48, as processing feedstock MC from the recovery port 453.

Thus comprised, the sheet manufacturing apparatus 100 has the same effect as the separator 45 described above. In addition, because fiber can be efficiently recovered, the sheet manufacturing apparatus 100 can manufacture high quality sheets S instead of making sheets S containing components that are unsuitable to making sheets S.

5. Other Embodiments

The embodiments described above are only examples of specific embodiments of the invention as described in the accompanying claims, do not limit the invention, and can be varied in many ways as described below without departing from the scope and spirit of the invention as described in the accompanying claims.

For example, the foregoing embodiments describe the inside wall NH2 in contact with the inside surface 48a1 of the mesh drum 48. However, there may be a gap between the inside wall NH2 and the inside surface 48a1 of the mesh drum 48. Configurations in which there is not a gap between the inside wall NH2 and the inside surface 48a1 of the mesh drum 48 are not limited to the inside wall NH2 being in direct contact with the inside surface 48a1, and a seal may be disposed between the inside wall NH2 and the inside surface 48a1 so that there is not a gap between the inside wall NH2 and the inside surface 48a1 of the mesh drum 48.

The embodiment described above also describes a configuration in which air flows from the material supply area A4 to the discharge area A2 due to the suction from a suction unit 47 that communicates with the discharge port 455. However, the configuration creating an air flow in this direction is not limited to suction from a suction unit 47. For example, a blower that supplies an air flow toward the case 451 may be disposed to the conduit 4, and the blower may be create the air current through the case 451, in this configuration, an air current is supplied from the supply port 452 to the material supply area A4, and air passes through the mesh 49 from the material supply area A4 to the discharge area A2.

The sheet manufacturing apparatus 100 is also not limited to manufacturing sheets S, and may be configured to make rigid sheets or paperboard comprising laminated sheets, or other web products. The manufactured product is also not limited to paper, and may be nonwoven cloth. The properties of the sheets S are also not specifically limited, and may be paper products that can be used as recording, writing, or printing on (such as copier paper, plain paper); wall paper, packaging paper, color paper, drawing paper, or bristol paper. When the sheet S is nonwoven cloth, it may be common nonwoven cloth, fiber board, tissue paper, kitchen paper, vacuum filter bags, filters, liquid absorption materials, sound absorption materials, cushioning materials, or mats.

At least part of the controller 110 of the sheet manufacturing apparatus 100 may also be embodied by hardware, configurations embodied by the cooperation of hardware and software, and is not limited to configurations of independent hardware resources.

The sheet manufacturing apparatus 100 according to the foregoing embodiments describe a dry process sheet manufacturing apparatus that acquires material by defibrating feedstock in air, and manufactures sheets S using the acquired material and resin. Application of the invention is not limited to such a device, however, and can be applied to a wet process sheet manufacturing apparatus that creates a solution or slurry of feedstock containing fiber in water or other solvent, and processes the feedstock into sheets. The invention can also be applied to an electrostatic sheet manufacturing apparatus that causes material containing fiber defibrated in air to adhere to the surface of a drum by static electricity, for example, and then processes the feedstock adhering to the drum into sheets.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No: 2017-244010, filed Dec. 20, 2017 is expressly incorporated by reference herein.

What is claimed is:

1. A separator comprising:
a mesh member disposed within the separator, the mesh member configured as a rotatable cylinder having mesh in at least part of the circumferential surface; and
a case housing the mesh member, and having a first opening and a second opening communicating with a first area inside of the mesh member, a third opening communicating with a second area outside of the circumferential surface of the mesh member,
a first wall segregating at least a part of the first area and forming a third area,
the second opening communicating with the third area,
separator feedstock containing fiber supplied from the first opening to the first area, and
accreted material, which is a part of the separator feedstock supplied from the first opening that has accreted on the circumferential surface of the mesh member, being recovered from the second opening in the third area.

2. The separator according to claim 1, wherein:
a component of the separator feedstock supplied from the first opening that moves through the mesh member to the second area by an air current flowing from the first area to the second area exits with the air current from the third opening.

3. The separator according to claim 1, wherein:
the first area has a fourth area segregated by the first wall from the third area, and the first opening communicates with the fourth area.

4. The separator according to claim 1, further comprising:
an air current generator configured to supply an air current flowing from outside the circumferential surface of the mesh member, through the mesh member, to the third area.

5. The separator according to claim 4, further comprising:
a fifth area communicating through the mesh member with the third area, and a second wall between the second area and the fifth area.

6. The separator according to claim 1, further comprising:
a remover configured to remove in the third area the accreted material accreted on an inside surface of the mesh member.

7. The separator according to claim 1, wherein:
the mesh member has multiple blades arrayed in the circumferential direction on the circumferential surface.

8. The separator according to claim 1, wherein:
the mesh member has multiple openings that are longer along the axis of rotation than the circumferential direction.

9. A sheet manufacturing apparatus comprising:
a defibrator configured to defibrate feedstock containing fiber;
a separator configured to classify defibrated material output from the defibrator; and
a processor configured to process separated material classified by the separator;
the separator having a mesh member disposed within the separator, the mesh member configured as a rotatable cylinder with mesh in at least part of the circumferential surface, and
a case housing the mesh member,
the case having a first opening and a second opening communicating with a first area inside of the mesh member, a third opening communicating with a second area, which is outside the mesh member,
a wall segregating at least a part of the first area and forming a third area,
the second opening communicating with the third area,
separator feedstock containing fiber supplied from the first opening to the first area, and
accreted material, which is a part of the separator feedstock supplied from the first opening that has accreted on the circumferential surface of the mesh member, being recovered from the second opening in the third area.

* * * * *